Nov. 10, 1925.

C. B. WISE

COMBINATION PAN

Filed June 4, 1923

1,561,132

Cora B Wise
INVENTOR.
BY John M. Spellman
ATTORNEYS.

Patented Nov. 10, 1925.

1,561,132

UNITED STATES PATENT OFFICE.

CORA B. WISE, OF DALLAS, TEXAS.

COMBINATION PAN.

Application filed June 4, 1923. Serial No. 643,194.

*To all whom it may concern:*

Be it known that I, CORA B. WISE, a citizen of the United States, residing at Dallas, in the county of Dallas and State of Texas, have invented certain new and useful Improvements in Combination Pans, of which the following is a specification.

This invention relates to dishpans, and in that connection refers to a dishpan constructed in such a manner as to form when extended beyond its normal length, an auxiliary draining or rinsing pan, the dish and draining pans being so shaped as to conform to the shape of a standard kitchen sink.

An object of the invention is to provide a dishpan with an adjustable extension thereto that may be used as an auxiliary pan wherein the dishes may be drained after same have been washed.

Another object of the invention is to provide a pan that will conform to the shape of a sink and may be adjustable longitudinally therein, and may be lifted easily therefrom.

Another feature is the provision adjacent to one end of the dishpan of a metal strip in attachment thereto, one end of which is so shaped as to engage a tongue on the rinsing pan extension, when the invention is not in use, to maintain the dishpan and the rising pan in nested relationship, in which the combination of the two will take up the smallest possible space when hung on the wall.

Other objects and features will be set forth in the following description, of which the drawings attached hereto form a part.

Figure 1:
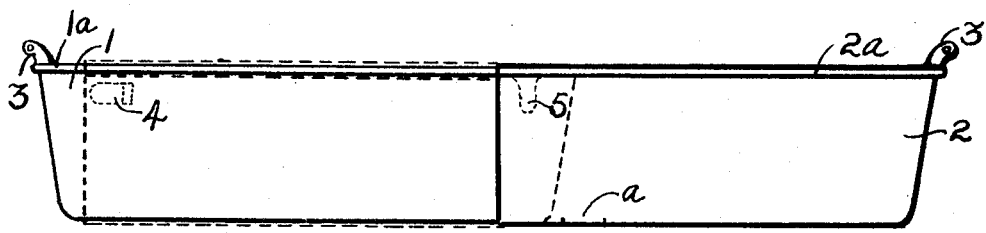
Figure 1 represents a side elevation of the invention with the pans extended for use.

In Figure 1, the body of the dishpan 1 is shown, with the draining pan 2, one end of which is open to allow it to pass over the dishpan 1, guided in its passage by rolled edge guide 2ª engaging the rolled edge 1ª of the dish pan 1, said engagement preventing the two pans from lateral separation. Handles 3, of construction to take up the smallest possible space, are affixed to one end of the dish pan and to the closed end of the draining pan, so that the combination of the two pans may be easily lifted. In Figure 1 is also shown the opening or openings a, through which the water poured over the dishes in the rinsing or draining pan may immediately pass out of the pan. The dotted lines show the relative positions of the elements of the invention when it is not desired to use the draining pan extension.

Figure 2:
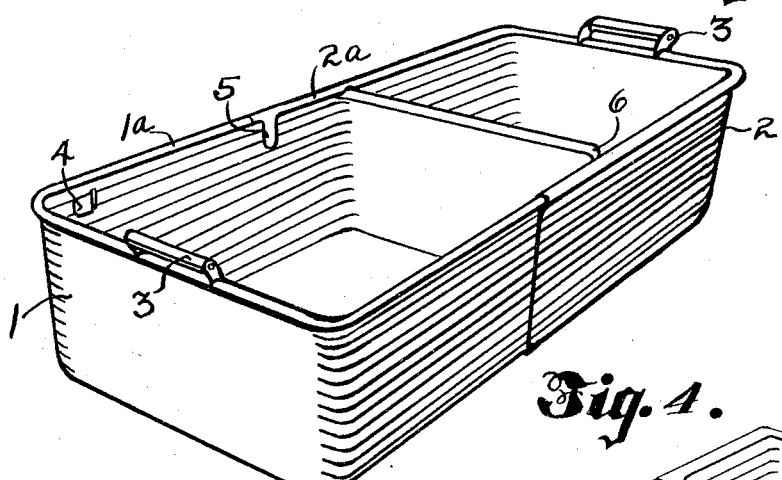
Figure 2 shows a perspective view of the invention.
Figure 4:
Figure 4 illustrates the drainer removed from the pan.

In Figure 2 the invention is shown partly extended, with a catch and finger 4 and 5 thereon, the engagement of which locks the pans together from movement longitudinally, when it is desired to use the dishpan without the draining pan attachment, or when it is desired to hang the combination of the two, up out of the way, on the wall or other suitable place.

This locking arrangement is effected by moving the finger sufficiently hard against the catch to cause the latter to spring downward and permit the finger to pass beyond the catch. By lifting the finger, the drainer can be moved until it strikes the opposite end of pan 1.

The rim 1ª of the dishpan is so cut away (shown at point 6) as to allow free sliding movement of rolled edge 2ª over rolled edge 1ª.

Figure 3:
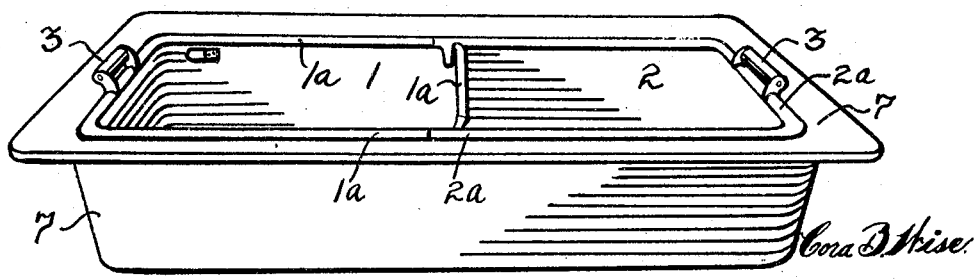
Figure 3 shows a perspective view of the invention placed in a sink.

In Figure 3 the invention is shown placed in a sink 7, and extended sufficiently to completely fill the sink and utilize all the available space therein.

It should be understood that the draining pan may extend to a point below the hot water faucet 8, as shown, 9 representing the cold water faucet, to allow the water to run directly on the dishes to be drained. The means for guiding the extension of the pans may be varied without departing from the spirit of the invention, which embodies principally the idea of the combination feature of washing and rinsing in one article.

What is claimed is:

1. The combination with a dish pan and a drainer telescopically connected thereto, a lug projecting inwardly from said dish pan, a resilient finger carried by said drainer, said finger adapted to engage said lug for retaining said drainer in one position and contact with a wall of the dish pan for limiting the outward movement of said drainer.

2. A combination dish pan and drainer comprising a pan section and a drainer section, telescopically connected together adapted to be seated within a sink, the dish pan section comprising a bottom, side and end walls, a rolled edge formed with said side and end walls, the drainer section comprising a bottom, side walls and an end wall, a rolled edge formed with said side walls of the drainer for receiving the side walls and rolled edges of the dish pan, a finger projecting from one of the side walls of said drainer section for limiting the sliding movement of said drainer section, and a handle carried by each section.

In testimony whereof I have signed my name to this specification.

CORA B. WISE.